(12) United States Patent
Weldy (10) Patent No.: US 9,352,678 B1
(45) Date of Patent: May 31, 2016

(54) VEHICLE LOWERING SYSTEM

(71) Applicant: Ross Weldy, Bristol, IN (US)

(72) Inventor: Ross Weldy, Bristol, IN (US)

( * ) Notice: Subject to any disclaimer, the term of this patent is extended or adjusted under 35 U.S.C. 154(b) by 13 days.

(21) Appl. No.: 14/581,459

(22) Filed: Dec. 23, 2014

(51) Int. Cl.
| | | |
|---|---|---|
| *B60G 17/00* | (2006.01) | |
| *B60P 1/08* | (2006.01) | |
| *B60G 7/00* | (2006.01) | |
| *B60P 1/43* | (2006.01) | |

(52) U.S. Cl.
 CPC . *B60P 1/08* (2013.01); *B60G 7/001* (2013.01); *B60P 1/431* (2013.01)

(58) Field of Classification Search
 CPC ........ B60P 1/44; B60P 1/4407; B60P 1/4414; B60P 1/4471; B60G 2300/04
 USPC ....... 280/6.151, 6.153, 43.11, 414.1
 See application file for complete search history.

(56) References Cited

U.S. PATENT DOCUMENTS

| | | | | |
|---|---|---|---|---|
| 2,957,593 A * | 10/1960 | Evans | ................... | B60P 3/1033 280/124.157 |
| 2,990,966 A * | 7/1961 | Schramm | ................ | B60P 1/025 414/476 |
| 3,335,887 A * | 8/1967 | Snook | ....................... | B60P 1/24 414/476 |
| 4,260,315 A * | 4/1981 | Bouffard | ................. | B60P 3/122 280/43.11 |
| 4,290,733 A * | 9/1981 | Lahman | ............... | A01D 87/126 280/83 |
| 5,195,764 A * | 3/1993 | Schantz | ................... | B60G 5/04 280/43.22 |
| 5,975,828 A | 11/1999 | Weldy | | |
| 6,135,700 A * | 10/2000 | Collins | .................... | B60P 3/07 280/43.23 |
| 6,592,139 B1 * | 7/2003 | Shanahan | ............... | B60P 1/027 280/414.5 |
| 7,137,642 B2 * | 11/2006 | Mitchell | ................... | B60P 9/00 280/418.1 |
| 7,243,979 B1 * | 7/2007 | Stene | ...................... | B60P 1/027 296/163 |
| 8,267,410 B1 * | 9/2012 | Stutz | ....................... | B60G 5/00 280/43.23 |
| 2006/0186616 A1 * | 8/2006 | Rudiger | ................... | B60G 3/14 280/6.15 |

* cited by examiner

*Primary Examiner* — Toan To
(74) *Attorney, Agent, or Firm* — Botkin & Hall, LLP

(57) ABSTRACT

A vehicle with a lowering suspension is provided where at least one axle can be moved between a raised position and a lowered position. A cargo area is located above the axle and can be raised and lowered with the axle. When the axle is in the lowered position, a spindle on the axle is located above a part of the frame, allowing the cargo area to be lowered. The cargo area includes an integral ramp that can be raised and lowered.

18 Claims, 9 Drawing Sheets

VEHICLE LOWERING SYSTEM

BACKGROUND OF THE INVENTION

Having a separate trailer to haul objects that are heavy often requires the use of a ramp. Having a ramp on a trailer may require a steep incline. The longer the ramp leading onto a trailer, the less steep the incline. There is a tradeoff between shorter ramps with a steep incline or longer ramps and a relatively more gradual incline. Having a longer ramp may not always be possible due to its weight, or the lack of space to store such a ramp. Ideally, the towing vehicle could be lowered near the ground to eliminate the need for a separate trailer having a ramp. Vehicles are available that have adjustable height suspension systems, usually in the form of bladders that are inflated to raise the vehicle's suspension, but these systems have serious limitations in the amount of lowering and the height the cargo must reach in order to clear the suspension. For example, the amount of travel that these systems provide is insufficient to lower one end of the vehicle to the ground. Commonly available suspension systems for vehicles are physically limited in travel due to clearance issues between driveline members and the vehicle body. An improved vehicle lowering system is needed.

SUMMARY OF THE INVENTION

The present disclosure describes a suspension system that allows one end of a vehicle to raise or lower on command. The lowered position allows the user to load the vehicle (usually a pickup bed) by rolling, sliding, or carrying the payload up a gradual ramp that is generated by one end of the vehicle being lowered significantly. Ideally, the edge of the tailgate would touch or nearly touch the ground at the lowest position. Once the vehicle was loaded or unloaded, the suspension could be returned to the raised position in order to create enough ground clearance to safely drive the vehicle. This type of vehicle would have a lower payload platform, resulting in a lower center of gravity and increased safety.

BRIEF DESCRIPTION OF THE DRAWINGS

A preferred embodiment of this invention has been chosen wherein.

DESCRIPTION OF THE PREFERRED EMBODIMENT

Figure 1:
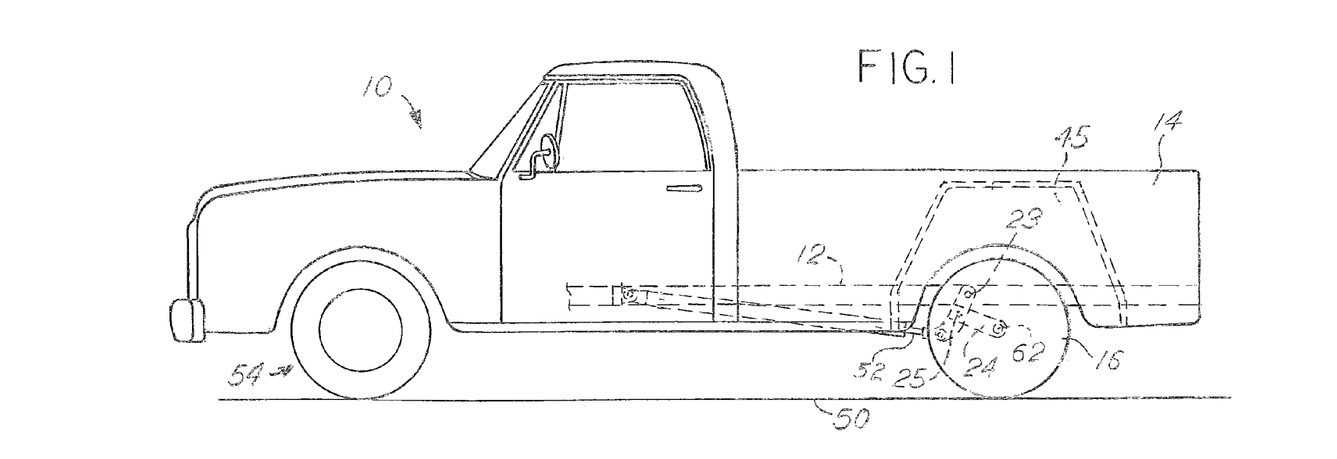
FIG. 1 is a side view of a pickup in its raised driving position.
Figure 2:
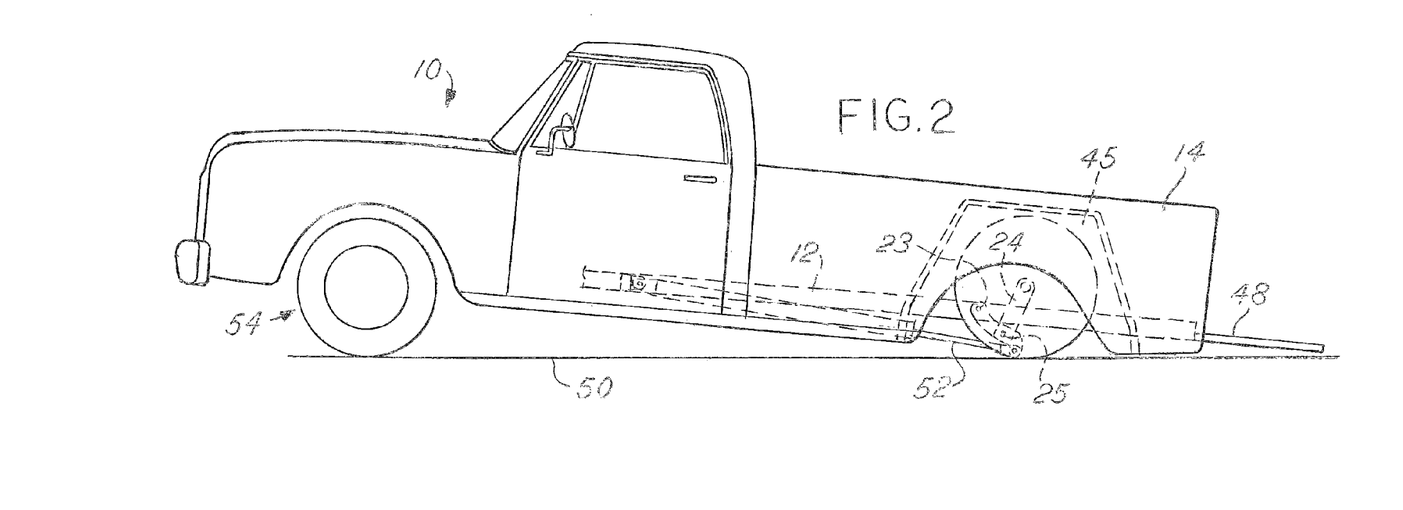
FIG. 2 is a side view of the pickup in FIG. 1 in its lowered position.
Figure 3:
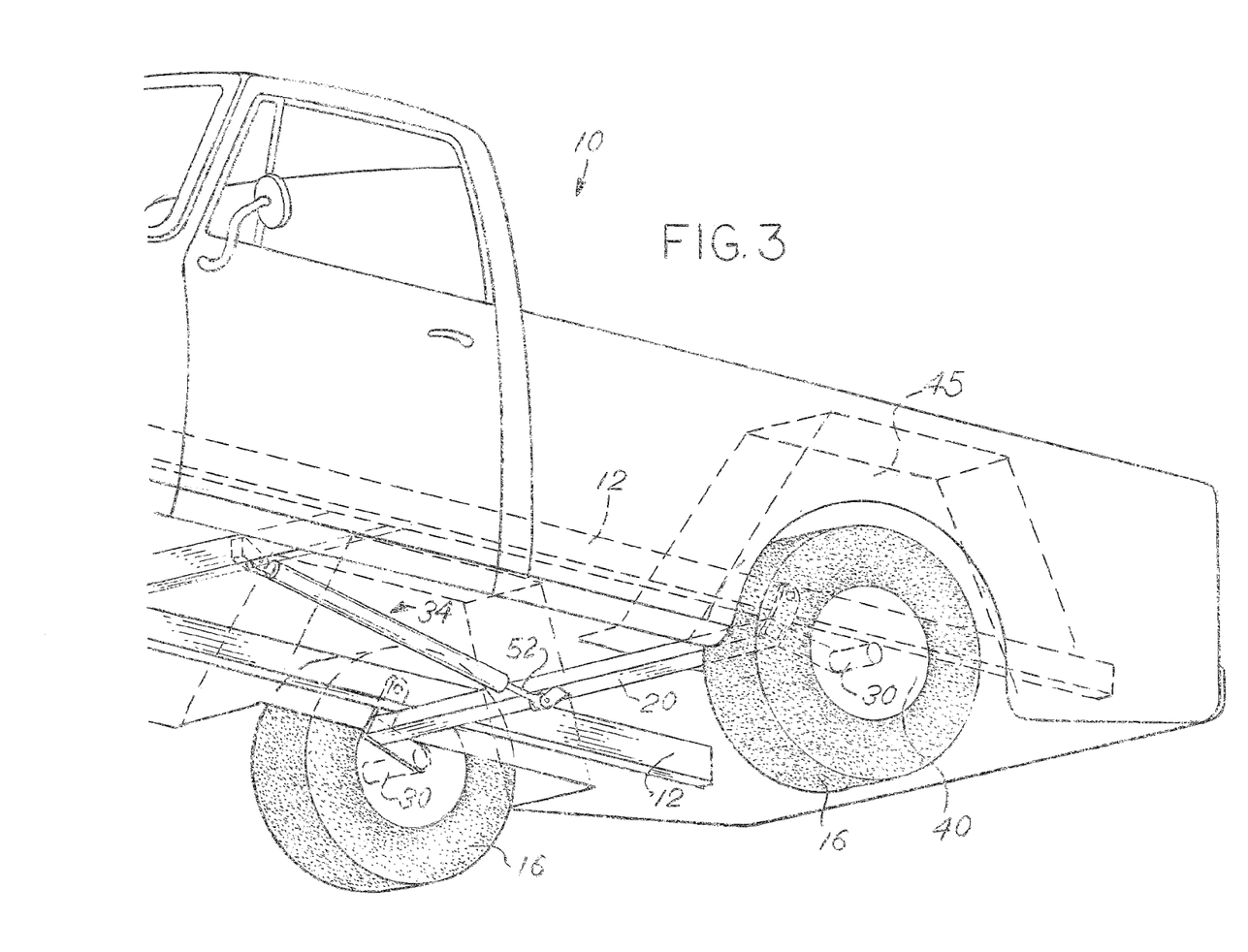
FIG. 3 is a perspective view of the suspension shown in FIG. 1.
Figure 4:
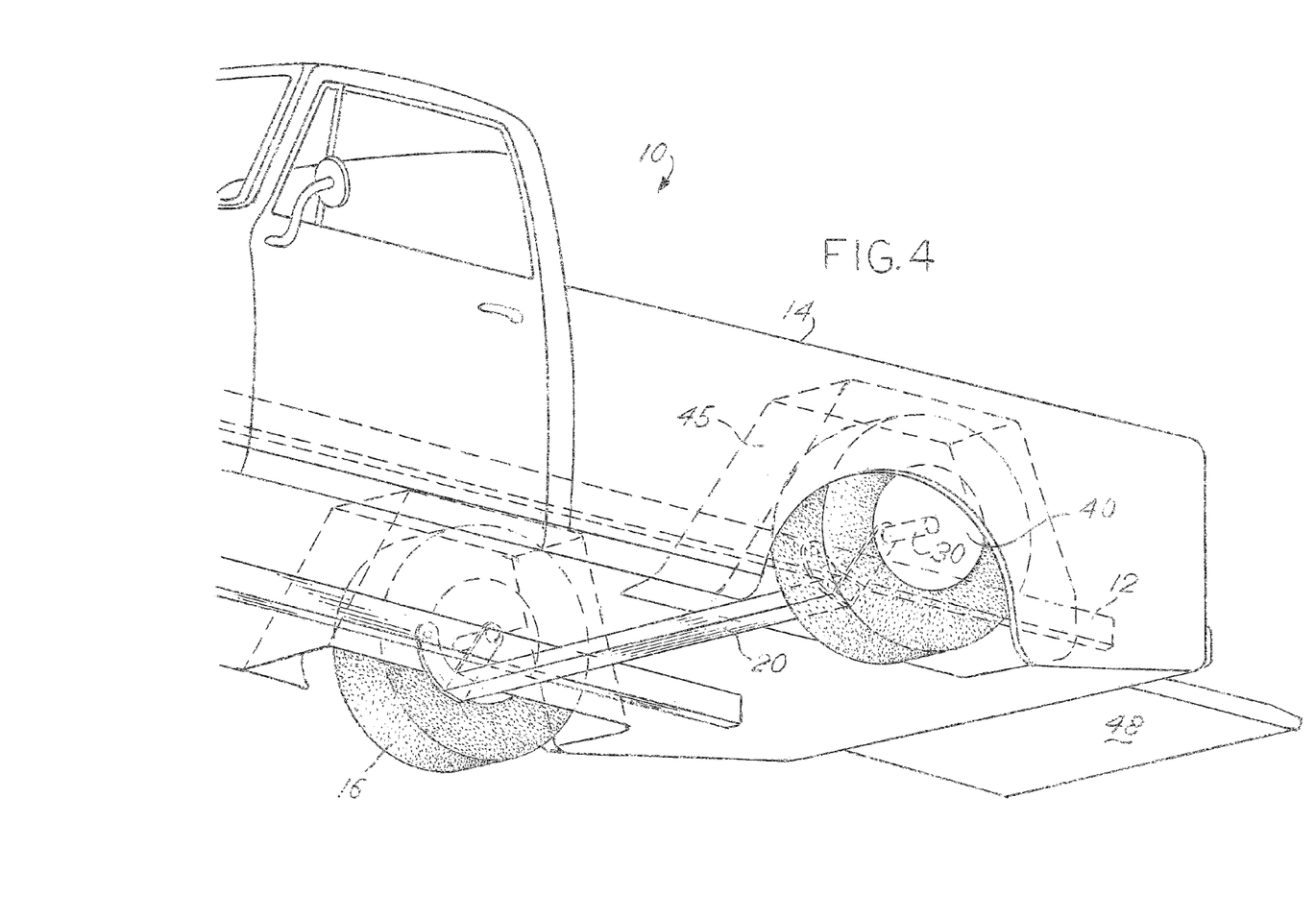
FIG. 4 is a perspective view of the suspension shown in FIG. 2.

The present invention is a vehicle 10 that has a system for lowering itself so that no separate ramp or lifting mechanism is necessary for loading or unloading a payload. In this case, a pickup has been used to illustrate the invention. However, the vehicle 10 could be a van, flatbed truck, or other vehicle that would benefit from a portion being lowered to the ground 50 as is shown in FIG. 2. The vehicle 10 of the present invention has a conventional body that is indistinguishable from any other pickup. As is typical, the vehicle 10 has a frame 12 that runs along the undercarriage. However, trucks typically have a body-on-frame construction. The frame could be integral to the body, commonly referred to as a unibody to those skilled in the art. The frame 12 runs under a bed 14 or a cargo surface 44, FIG. 6 and is L-shaped with a horizontal portion 26 and a vertical portion 18. FIG. 1 shows the vehicle 10 with the front wheels 54 and a rear wheel 40 shown in dotted lines to indicate its position. Located underneath the cargo surface 44 is an axle 20. Axle 20 as shown in FIGS. 3 and 4 is a straight tube but can have other shapes. The axle 20 has a central axis 46, FIGS. 5 and 7. Arms 22 extend outwardly from the central axis 46 and are connected to the frame 12 and pivot about pivot point 23, FIGS. 1, 2 and 7, and welded near ends of the axle 20. Two or more pivot points line up to define a pivot axis 32. The pivot axis 32 is above the cargo surface 44. The pivot point 23 can be located inboard of the frame 12 where it protrudes upward through the cargo surface 44 or be located outboard of the frame 12 as shown in FIG. 7.

Figure 7:
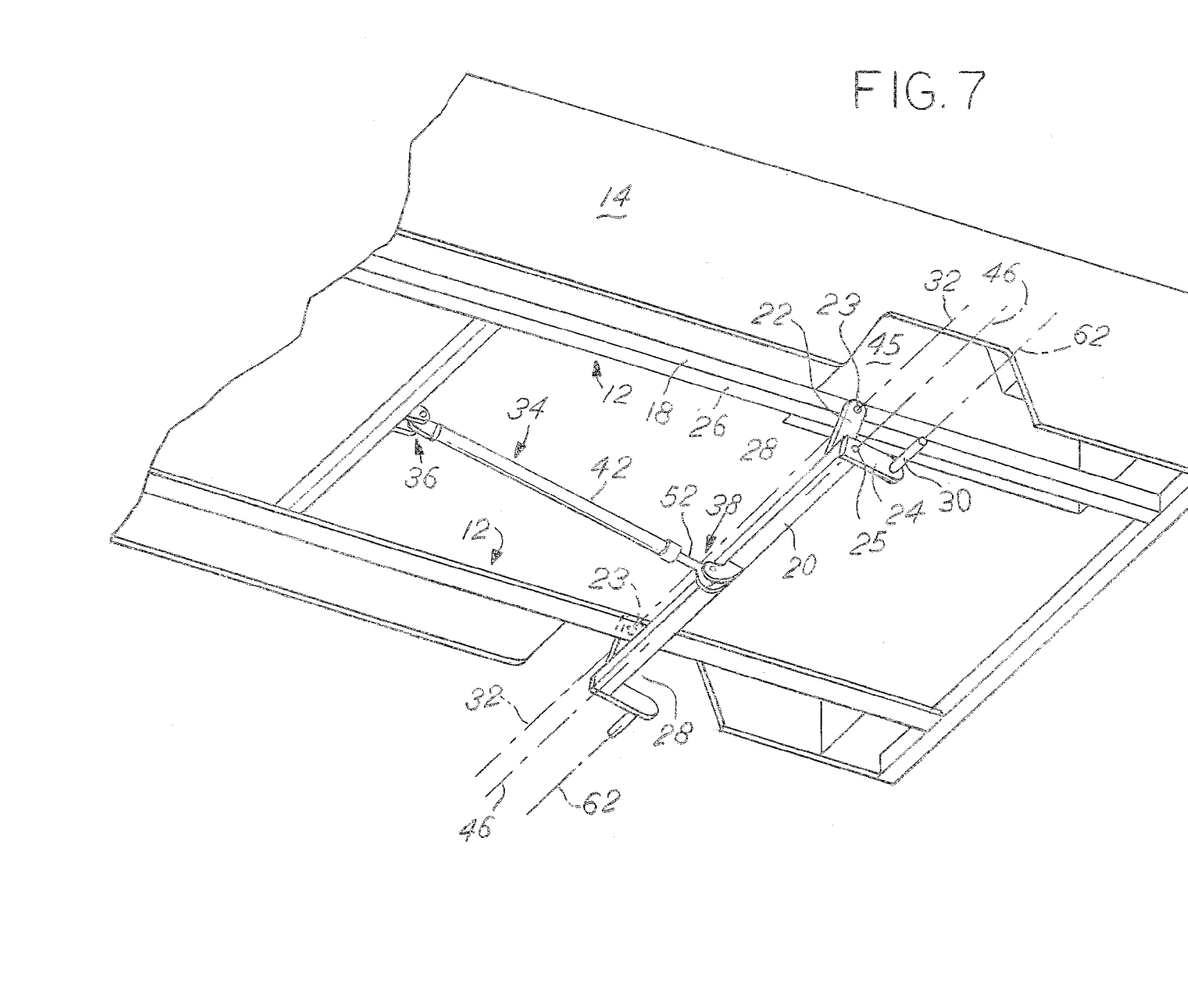
FIG. 7 is a perspective bottom view of the pickup in FIG. 2.
Figures 8, 8A:
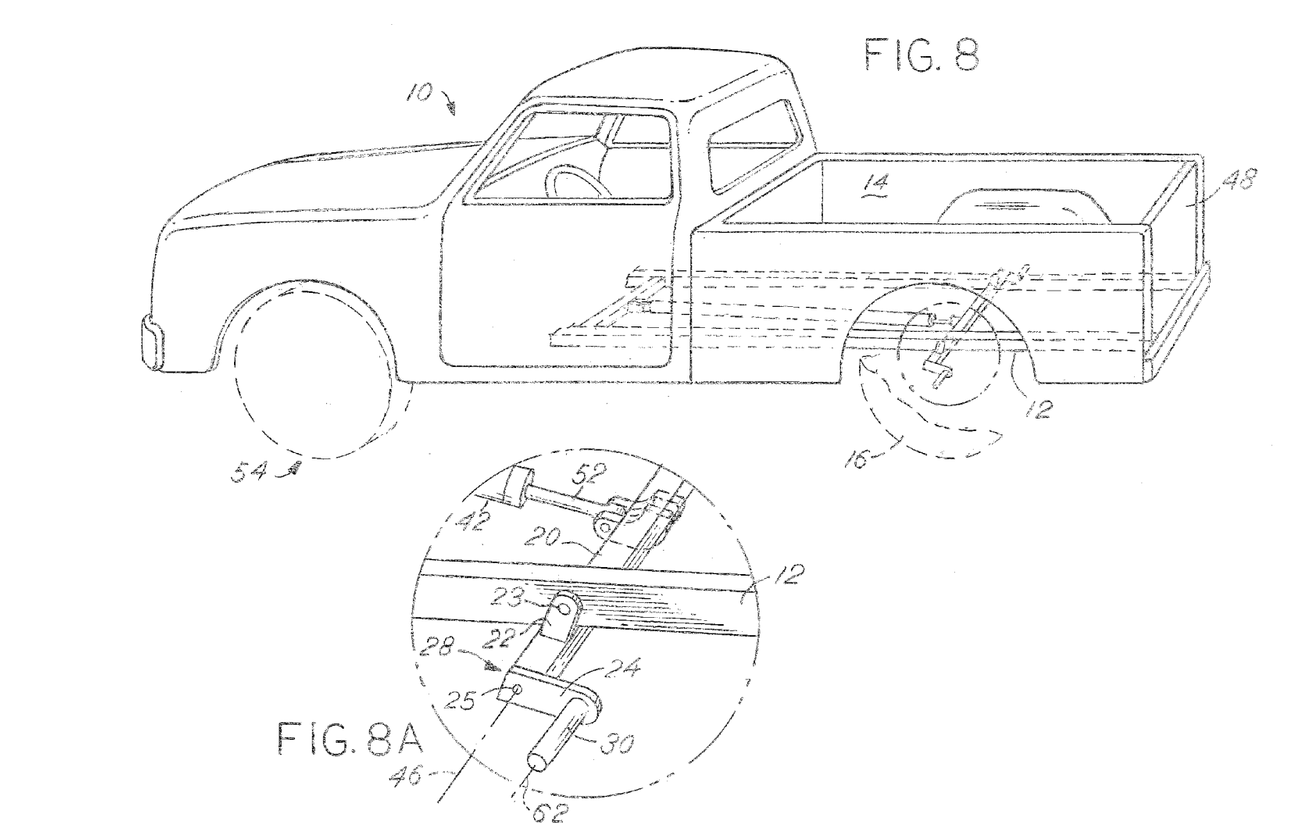
FIG. 8 is a perspective view of the pickup shown in FIG. 1.
FIG. 8A is a partial view of FIG. 8.

The axle 20 may include swing arms 24 that pivot about point 25 FIGS. 1, 2 and 7, which correspond with the central axis 46 of the axle 20. The swing arms 24 extend rearward of the axle 20 as shown in FIGS. 1 and 2, but can face forward and still function the same. The swing arms 24 are part of a torsion axle as commonly known in the art. The axle 20, combined with the swing arms 24, forms a standard torsion axle. The swing arms 24 resist torsional movement about the pivot point 25 that is near the terminal end 28 of the axle 20. The swing arms 24 are shown in an unloaded position in FIGS. 1, 7 and 8A. As the swing arm 24 supports weight and the torsion spring begins to twist, the swing arm 24 rotates about the central axis 46 of the axle 20 as shown in FIG. 7. At the end of the swing arms 24, spindles 30 are attached and spaced from the pivot point 25, FIG. 8A. The spacing of the spindle 30 from the first end 28 forms a swing arm 24 suspension. As shown in FIG. 7, the spindle 30 has a spindle axis 62 that is parallel to the central axis 46 of the axle 20. As each swing arm 24 has its own torsion spring, each is allowed to move independently of the other. The independent nature of the suspension assures good contact of the vehicle 10 to the ground 50 when parked or moving over uneven ground. Independent swing arm suspension is commonly known in the art. Wheels 40, with tires 16, rotate about the spindle axis 62, FIG. 7 and are supported by bearings as is commonly known in the art. However, those skilled in the art could reverse the direction at which the swing arms 24 extend from axle 20 and the suspension would still function as a torsional suspension. It is also possible to use alternative suspension instead of a swing arm.

A cylinder 34 has a body 42 with a first end 36 that is connected to a point forward of the axle 20 to the underside of the vehicle, FIG. 7. The first end 36 is attached to the vehicle with a pin and clevis connection so that it may pivot about its first end 36. The cylinder 34 also has a movable shaft 52 with a second end 38 that is connected to the axle 20 near its midpoint. Internal to the body 42 and affixed to the shaft 52 is a piston. Fluid displacement on both sides of the piston moves the piston and therefore the shaft 52. The second end 38 is connected with a pin and clevis connection. The shaft 52 is movable between a retracted position and an extended position. The retracted position is shown in FIGS. 1 and 3. The extended position of the cylinder 34 is shown in FIGS. 2 and 4. The cylinder 34 could be pneumatic, electric, or hydraulic. When the cylinder 34 is in its refracted position, the rear wheels 40 of the vehicle 10 will be in the position in which the vehicle will be driven, corresponding to a normal ride height. When in the refracted position, cylinder 34 and the vehicle will take advantage of the torsional suspension and the wheels will pivot about point 25 and act as an ordinary trailing arm torsional suspension. It is possible to locate the cylinder on the opposite side of the axle, where the extended position causes the vehicle to raise and the retracted position causes the vehicle to lower. The spindles 30 will be below the frame 12 as is typical due to the necessary ground clearance. When in the extended position, cylinder 34 and the vehicle will be in the lowered position as shown in FIGS. 2 and 4. In this position, the spindles 30 will be above the lowermost portion of the frame 12 and the cargo surface 44.

The separate swing arms 24 make it possible for the spindles 30 and thus the centers of the wheels 40 to be above the frame 12 because there is not an axle running directly in line with the spindles 30. The spindle 30 is located below the cargo surface 44 when the vehicle is in the driving position as is shown in FIGS. 1 and 3. When the vehicle is moving in reverse, the wheels 40 may encounter resistance. The resistance could create compression force on the cylinder 34, which is normally in compression. A cable or other lifting means could cause the axle to move unexpectedly, while the cylinder requires positive displacement to move the axle. The cylinder can provide force in tension or compression, unlike a cable or pulley system.

The axle 20 or cylinder 34 could have a lock to prevent movement of the axle 20 when the vehicle is in the driving position. In the event that stops are not present, failure of the cylinder could result in the vehicle lowering unintentionally. For safety or service, it is possible to instead add a lock to arms 22 or axle 20 in either the driving or loading position. Locking the lever arms 22 in the driving position prevents braking, acceleration, or the weight of the vehicle from being transmitted to the cylinder 34. Additionally, the addition of a lock allows the vehicle 10 to be secured for service of the system or any other part of the vehicle that would require immobilization of the lowering system.

The axle 20 provides adequate ground clearance to the cargo surface 44 when lowered and the ground 50 when raised. The wheels 40 when they are in the position shown in FIGS. 2 and 4, are retracted into wheel wells 45. Because the spindles 30 can be above the frame 12, the cargo surface 44 of the bed 14 can be as low as the bottom portion 26 FIGS. 6 and 7 of the frame 12 if necessary, as shown in FIG. 7. The configuration of the present invention allows for a significantly lower bed than would be possible if a typical rear wheel drive train were located between the wheels 40.

Figure 5:
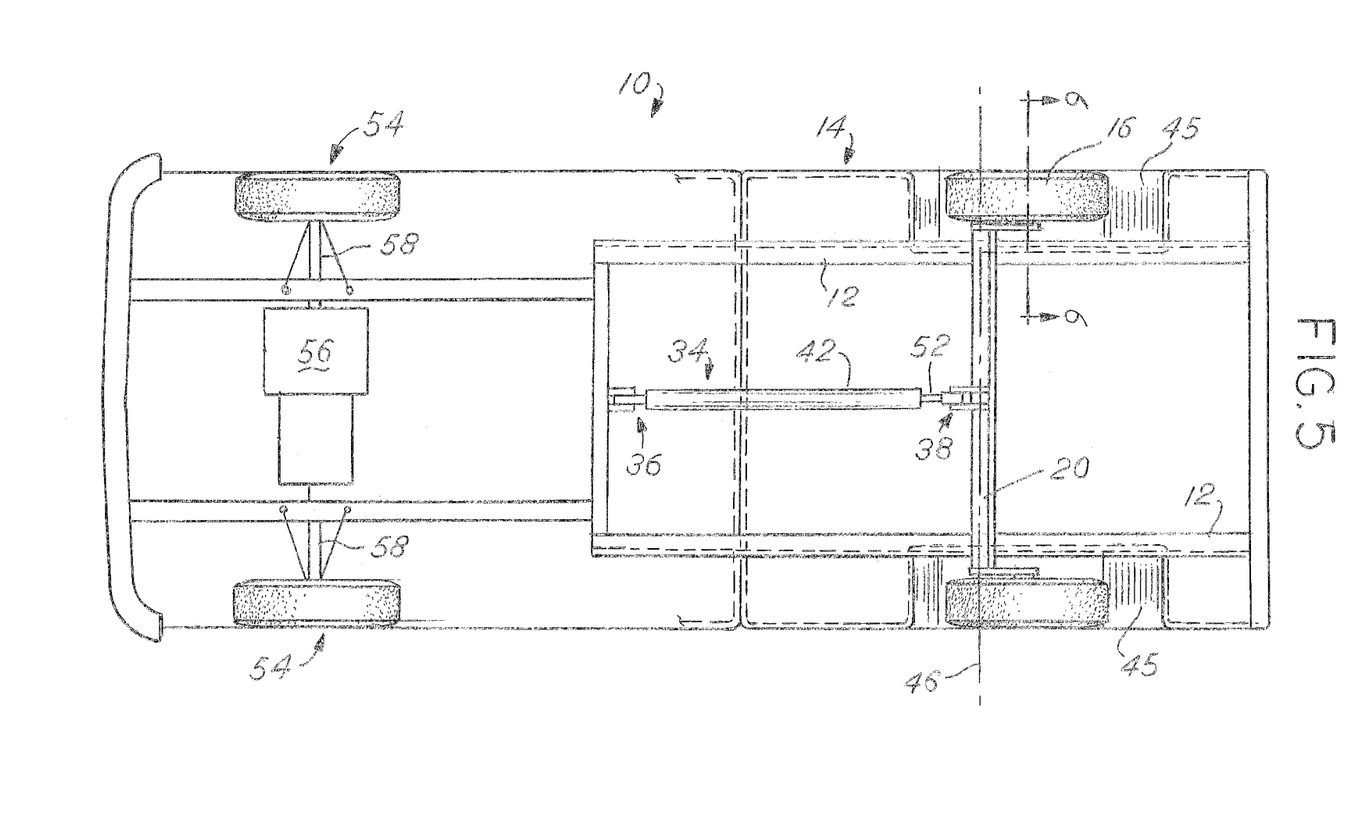
FIG. 5 is a bottom view of the pickup in FIG. 1.

Because the axle 20, as shown in the embodiment, is not connected to a transmission in the vehicle 10, it cannot provide standard propulsion from an engine 56. Brakes can be installed over the spindle 30 to provide stopping force. It is also possible to integrate an electric motor on the spindle 30 such that electric propulsion is possible, as is commonly known in electric vehicle art. Standard propulsion from an engine 56 would be from another axle in the vehicle, such as the half shafts 58 attaching the front wheels 54 of the vehicle 10 to the power train as shown in FIG. 5.

Figure 6:
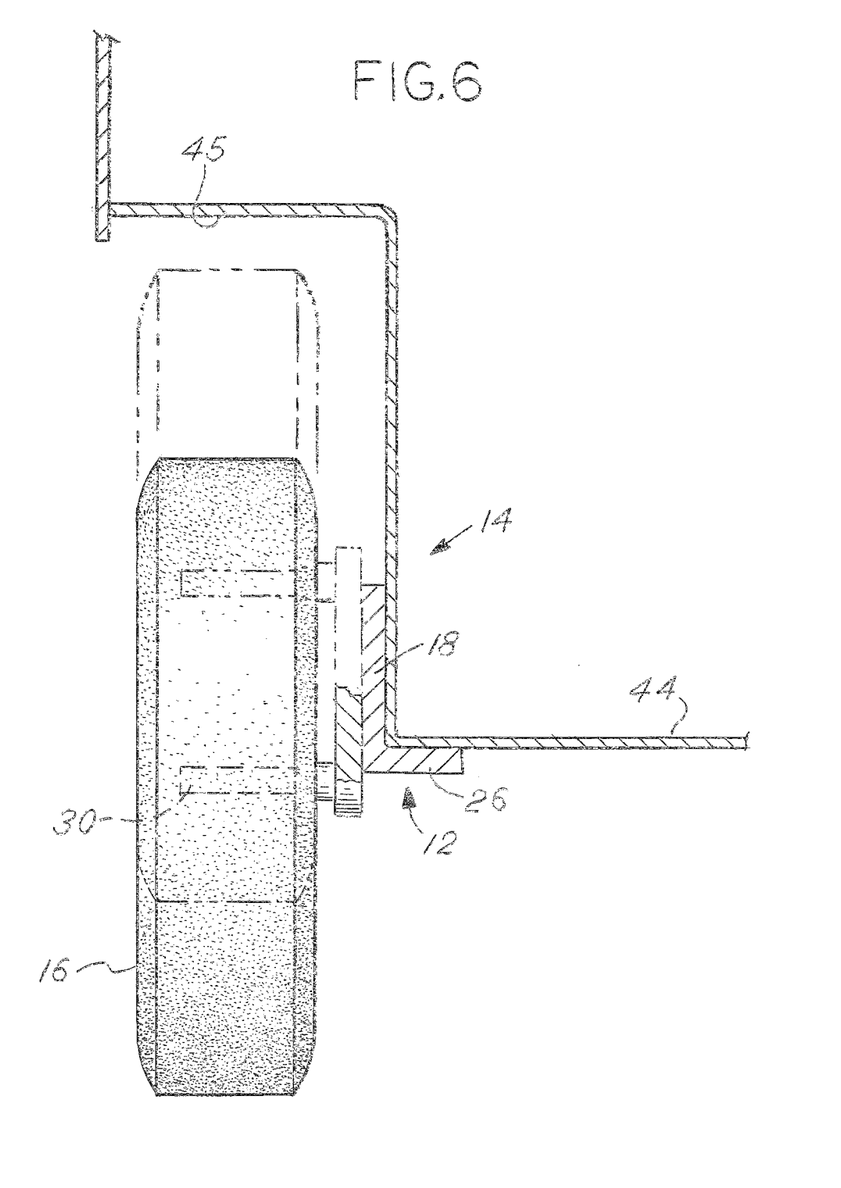
FIG. 6 is a section 6-6 of the pickup in FIG. 5 showing the raised and lowered position.

As shown in FIG. 4, the cargo surface 44, FIG. 6, may be lowered very near the ground. A tailgate 48 may be dropped as shown in FIG. 4 so that it meets the ground 50 on which the vehicle 10 rests. This forms an integral ramp that functions to retain cargo when not in use. It is also possible to locate the axle 20 and cargo surface 44 such that a tailgate is not necessary. Lowering the vehicle could bring the furthest end of the cargo surface 44 in contact with the ground.

Figure 9:
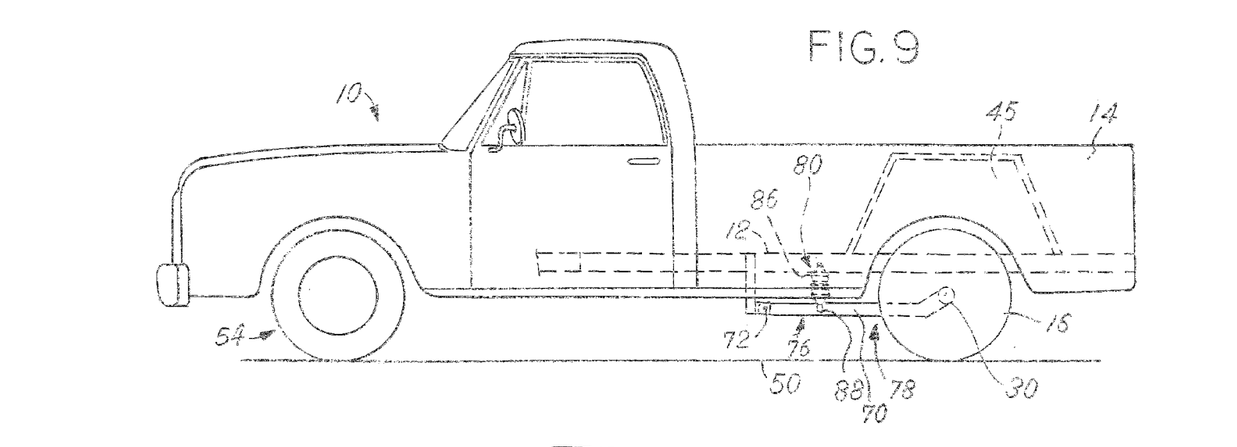
FIG. 9 is a side view of an alternate embodiment in the driving position.
Figure 10:
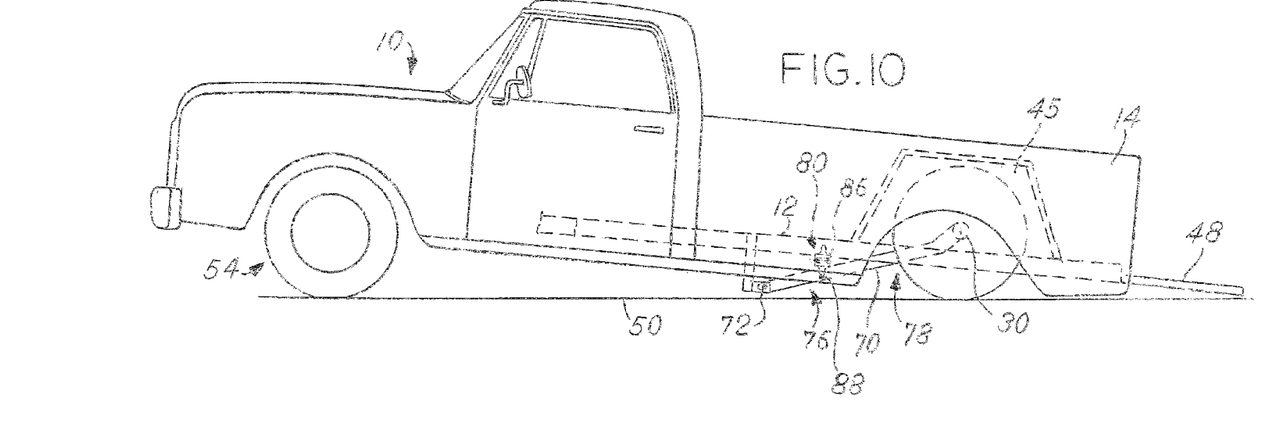
FIG. 10 is a side view of the embodiment of FIG. 9 in the lowered position.
Figure 11:
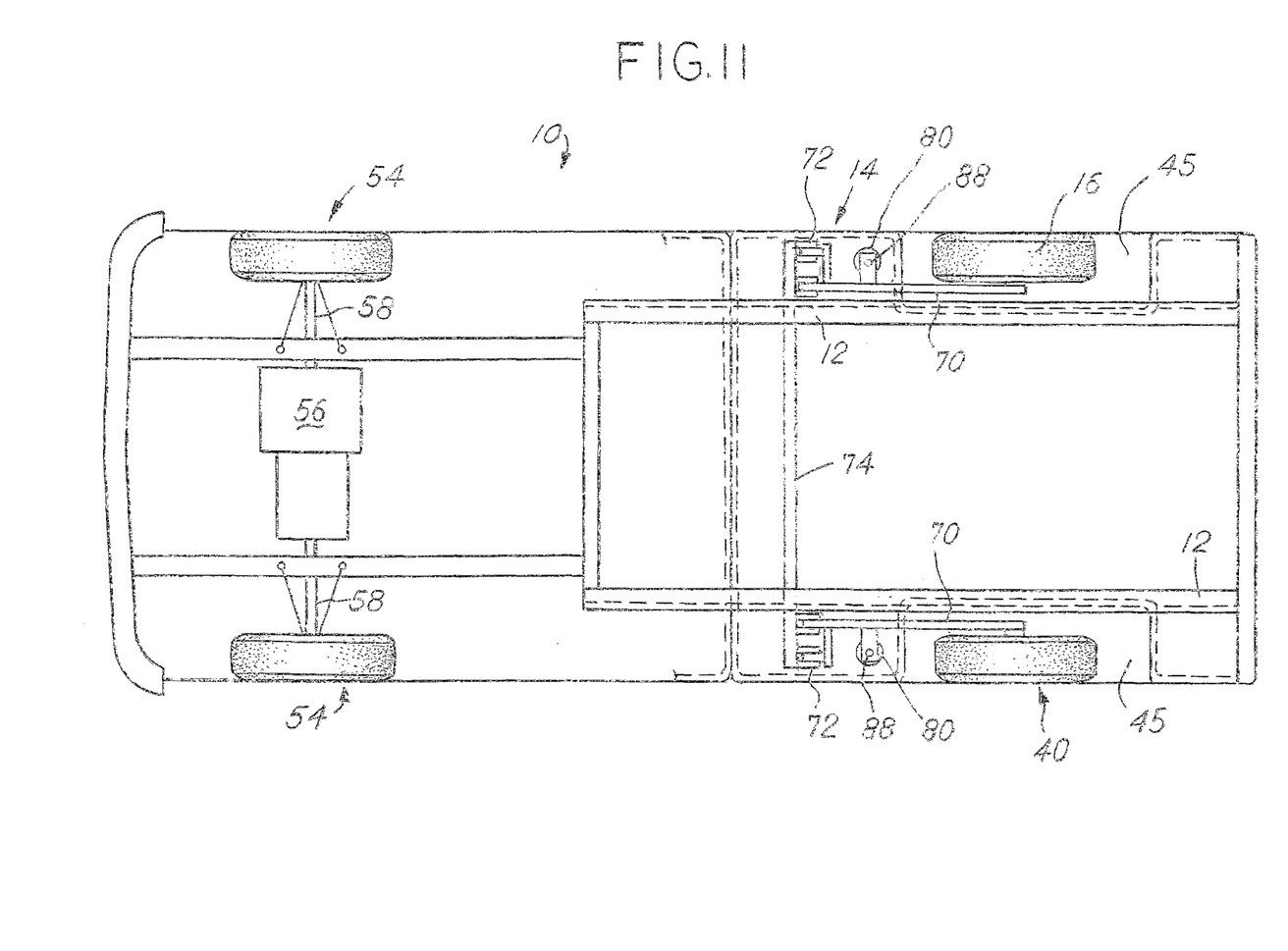
FIG. 11 is a bottom view of the embodiment of FIG. 9.

As shown in FIGS. 9 and 10, it is possible to incorporate the suspension and lifting mechanism into one link 70. The link 70 has a first end 76 that is near a pivot point 72 where opposite sides of the vehicle are connected with an axle 74. The axle 74 ties both links together and it is contemplated that it serves as a stabilizing bar. On a second end 78, spindles 30 are attached. As shown in FIG. 9, when the vehicle 10 is in the driving position, the spindles 30 are above the cargo surface 44. When the vehicle 10 is in the lowered position, the spindles 30 are above the cargo surface 44. Instead of a single cylinder 34, the raising and lowering of the links 70 is from actuator 80. The actuator can be either pneumatic or hydraulic. As with the cylinder 34, displacement of fluid causes a piston or a diaphragm to move between the raised and lowered position. The actuator 80 is attached to the frame 12 on one end at a first end 86 and the link 70 on the second end 88. The actuator 80 can act as suspension in addition to raising and lowering the vehicle. It is contemplated that the link 70 is spring-loaded to the raised position and the actuator 80 is used to lower the vehicle. In that case, failure of the actuator would move the vehicle to the raised position.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A lowering suspension for a vehicle having driving wheels, said lowering suspension comprising:
    a cargo area overlying a portion of a frame, said frame affixed to said vehicle;
    an axle located underneath said cargo area, said axle having a central axis, said axle including arms affixed thereto and extending outward from said central axis, each of said arms having a pivot point, each of said pivot points of said arms aligned to form a pivoting axis being spaced from said central axis of said axle, said axle capable of pivoting with respect to said pivot axis between a raised and lowered position, said pivoting axis intersecting said frame;
    an actuator having a first end and a second end, said first end affixed to said vehicle, said second end connected to said axle, said actuator movable between a retracted and an extended position, said actuator capable of moving said axle between said raised and lowered position;
    a swing arm pivotal about an axis that is coaxial with said central axis of said axle, said swing arm having a spindle with a rotational spindle axis offset from said central axis;
    a wheel capable of rotation with respect to said rotational axis of said spindle; and
    when said axle is in said lowered position, said spindle axis is located above said cargo area and said axle is in said raised position, said spindle axis is located below said cargo area.

2. The lowering suspension according to claim 1, said vehicle being supported by wheels in biased contact with a ground plane, said cargo area including a ramp having a top edge, said ramp moveable between a loading position and a stored position, said stored position acting to enclose a portion of said cargo area, said top edge intersecting said ground plane when said tailgate is in said loading position and said axle is in said lowered position.

3. The lowering suspension according to claim 1, said actuator is a cylinder having a barrel, a piston affixed to one of said ends and moveable inside said barrel, said barrel affixed to the other of said ends and having fluid displacement ports on both sides of said piston.

4. The lowering suspension according to claim 3, said cylinder having hydraulic fluid and said piston moved by displacement of said hydraulic fluid.

5. The lowering suspension according to claim 4, said swing arm capable of pivoting with respect to said central axis between an unloaded position and a loaded position, said swing arm including a torsion spring, said spring biasing said swing arm toward said unloaded position, said torsion spring supporting said wheel in biased contact with a ground plane, said cargo area including a ramp having a top edge, said ramp moveable between a loading position and a stored position, said stored position acting to enclose a portion of said cargo area, said top edge intersecting said ground plane when said tailgate is in said loading position and said axle is in said lowered position.

6. The vehicle according to claim 1, said pivoting axis offset from said central axis.

7. The vehicle according to claim 1, said cargo surface being substantially parallel to a ramp surface on said ramp when said ramp is in said loading position.

8. The lowering suspension according to claim 5, said wheel capable of supplying torque.

9. A vehicle adapted for carrying a payload, said vehicle having:
    driving wheels capable of accelerating and decelerating said vehicle;
    a cargo surface, a portion of said cargo surface located above an axle;
    a frame affixed to said vehicle, said cargo surface affixed to said frame;
    said axle capable of movement between a raised and a lowered position, said axle having a central axis, said axle including a pivot arm with a pivot point, said pivot point fixed with respect to said vehicle and having a pivot axis intersecting said frame;
    a rigid actuator having a frame end and an axle end, said frame end attached to said frame, said axle end attached to said axle, said actuator capable of movement between a raised position and a lowered position; and
    said axle including a swing arm having a spindle axis parallel to said central axis and spaced therefrom, said swing arm having a wheel in biased contact with a ground plane, said wheel rotatable about said spindle axis, said spindle axis located above said cargo surface when said axle is in said lowered position and below said cargo surface when said axle is in said raised position and said spindle axis is located below said cargo area when said axle is in said raised position.

10. The vehicle according to claim 9, said vehicle being supported by wheels in biased contact with a ground plane, said cargo surface including a ramp having a top edge, said ramp moveable between a loading position and a stored position, said stored position acting to enclose a portion of said cargo surface, said top edge intersecting said ground plane when said tailgate is in said loading position and said axle is in said lowered position.

11. The vehicle according to claim 9, said swing arm capable of movement between an unloaded position and a loaded position, said swing arm including a torsion spring, said spring biasing said swing arm toward said unloaded position, said torsion spring supporting said wheel in biased contact with a ground plane, said cargo surface including a ramp having a top edge, said ramp moveable between a loading position and a stored position, said stored position acting to enclose a portion of said cargo surface, said top edge intersecting said ground plane when said tailgate is in said loading position and said axle is in said lowered position.

12. The vehicle according to claim 11, said actuator is a cylinder having a barrel, a piston affixed to one of said ends and moveable inside said barrel, said barrel affixed to the other of said ends and having fluid displacement ports on both sides of said piston.

13. The vehicle according to claim 12, said spindle axis parallel to said central axis.

14. The vehicle according to claim 13, said wheel capable of supplying torque.

15. A vehicle adapted for carrying a payload, said vehicle having:
    a cargo surface capable of supporting a payload, a portion of said cargo surface located above a moveable axle;
    a frame affixed to said vehicle, said cargo surface affixed to said frame;
    said axle having a raised and a lowered position, said axle having a central axis, said axle including a pivot arm with a pivot point, said pivot point with respect to said vehicle;
    an actuator having a frame end and an axle end, said frame end attached to said frame, said axle end attached to said axle, said actuator capable of movement between said raised and said lowered position, said actuator pivoting said axle about said pivot point during travel between said raised and said lowered position;
    said axle including a swing arm, said swing arm having a spindle axis, said spindle axis parallel to said axle axis and offset therefrom, said spindle adapted to receive a wheel, said wheel rotatable with respect to said spindle axis, said spindle axis located above said cargo surface when said axle is in said raised position;
    a wheel rotatable about said spindle axis; and
    said vehicle being supported by wheels in biased contact with a ground plane, said cargo surface including a ramp, said ramp having a top edge and capable of movement between a loading position and a stored position, said stored position acting to enclose a portion of said cargo surface, said top edge intersecting said ground plane when said tailgate is in said loading position and said axle is in said lowered position.

16. The vehicle according to claim 15, said arm pivotally affixed to said central axis and capable of movement between an unloaded position and a loaded position, said arm including a torsion spring, said spring biasing said swing arm toward said unloaded position.

17. The vehicle according to claim 16, said spindle axis located below said cargo surface when said axle is in said raised position.

18. The vehicle according to claim 17, said cargo surface including a ramp, said ramp having a top edge and capable of movement between a loading position and a stored position, said stored position acting to enclose a portion of said cargo surface, said top edge intersecting said ground plane when said tailgate is in said loading position and said axle is in said lowered position.

* * * * *